US008537761B1

(12) United States Patent
Kim et al.

(10) Patent No.: US 8,537,761 B1
(45) Date of Patent: Sep. 17, 2013

(54) INCORPORATION OF MESH BASE STATIONS IN A WIRELESS SYSTEM

(75) Inventors: Byoung-Jo Kim, Morganville, NJ (US); Nemmara K. Shankaranarayanan, Bridgewater, NJ (US); Amit Kumar Saha, Houston, TX (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1448 days.

(21) Appl. No.: 11/319,964

(22) Filed: Dec. 28, 2005

(51) Int. Cl.
*H04Q 7/00* (2006.01)
(52) U.S. Cl.
USPC .......... 370/329; 370/338; 370/334; 370/342; 370/441; 370/400
(58) Field of Classification Search
None
See application file for complete search history.

(56) References Cited

U.S. PATENT DOCUMENTS

| | | | | |
|---|---|---|---|---|
| 6,519,467 | B1* | 2/2003 | Strakovsky | 455/462 |
| 6,650,907 | B1* | 11/2003 | Kamperschroer et al. | 455/522 |
| 6,690,915 | B1* | 2/2004 | Ito et al. | 455/7 |
| 7,164,919 | B2* | 1/2007 | Chen | 455/452.2 |
| 7,403,506 | B2* | 7/2008 | Lee et al. | 370/331 |
| 7,496,078 | B2* | 2/2009 | Rahman | 370/338 |
| 7,555,261 | B2* | 6/2009 | O'Neill | 455/11.1 |
| 7,620,370 | B2* | 11/2009 | Barak et al. | 455/67.13 |
| 7,626,967 | B2* | 12/2009 | Yarvis et al. | 370/338 |
| 7,652,984 | B1* | 1/2010 | Kotecha | 370/217 |
| 7,729,329 | B2* | 6/2010 | Fujita et al. | 370/342 |
| 7,925,295 | B2* | 4/2011 | Yanover et al. | 455/552.1 |
| 2003/0108087 | A1* | 6/2003 | Shperling et al. | 375/146 |
| 2003/0134642 | A1* | 7/2003 | Kostic et al. | 455/450 |
| 2003/0169720 | A1* | 9/2003 | Sebastian et al. | 370/342 |
| 2004/0095907 | A1* | 5/2004 | Agee et al. | 370/334 |
| 2004/0132477 | A1* | 7/2004 | Lundby et al. | 455/522 |
| 2004/0156322 | A1* | 8/2004 | Mehra | 370/254 |
| 2004/0156384 | A1* | 8/2004 | Rune et al. | 370/432 |
| 2004/0167988 | A1* | 8/2004 | Rune et al. | 709/238 |
| 2004/0174900 | A1* | 9/2004 | Volpi et al. | 370/466 |
| 2005/0025099 | A1* | 2/2005 | Heath et al. | 370/334 |
| 2005/0068902 | A1* | 3/2005 | Rath | 370/256 |
| 2005/0128988 | A1* | 6/2005 | Simpson et al. | 370/338 |
| 2005/0153725 | A1* | 7/2005 | Naghian et al. | 455/520 |
| 2005/0170776 | A1* | 8/2005 | Siorpaes | 455/41.2 |
| 2005/0192037 | A1* | 9/2005 | Nanda et al. | 455/509 |
| 2005/0239466 | A1* | 10/2005 | Calin et al. | 455/437 |

(Continued)

OTHER PUBLICATIONS

Cho, Jaeweon et al., "On the Throughput Enhancement of the Downstream Channel in Cellular Radio Networks Through Multihop Relaying", IEEE Journal on Selected Areas in Communication, Sep. 2004, pp. 1206-1219, vol. 22, No. 7, IEEE, USA.

*Primary Examiner* — Joseph Arevalo
(74) *Attorney, Agent, or Firm* — Turocy & Watson, LLP

(57) ABSTRACT

The present invention provides methods for incorporating and operating a mesh base station in a wireless network. The mesh base station may utilize common wireless resource allocations as a corresponding wireless base station while transmitting to wireless subscriber stations during the same time period. The mesh base station obtains a data packet from the wireless base station over a backhaul link during a scheduled time period and transmits the data packet to the designated wireless subscriber station during another scheduled time period. The wireless base station and the mesh base station may also receive data packets from wireless subscriber stations during a same time period. A wireless network may be configured with two mesh base stations at an approximate boundary of two adjacent sector coverage areas, where a coverage area is supported by a wireless base station and each mesh base station supports wireless subscriber stations within a coverage radius.

17 Claims, 22 Drawing Sheets

(56) References Cited

U.S. PATENT DOCUMENTS

| | | | |
|---|---|---|---|
| 2005/0272430 A1* | 12/2005 | Griebling | 455/446 |
| 2006/0025136 A1* | 2/2006 | Fujita et al. | 455/436 |
| 2006/0039286 A1* | 2/2006 | Basu et al. | 370/238 |
| 2006/0039298 A1* | 2/2006 | Zuniga et al. | 370/252 |
| 2006/0062197 A1* | 3/2006 | Maddern et al. | 370/351 |
| 2006/0068849 A1* | 3/2006 | Bernhard et al. | 455/562.1 |
| 2006/0083205 A1* | 4/2006 | Buddhikot et al. | 370/338 |
| 2006/0084379 A1* | 4/2006 | O'Neill | 455/25 |
| 2006/0099954 A1* | 5/2006 | Henderson et al. | 455/447 |
| 2006/0252448 A1* | 11/2006 | Ichikawa | 455/522 |
| 2006/0268908 A1* | 11/2006 | Wang et al. | 370/401 |
| 2007/0147255 A1* | 6/2007 | Oyman | 370/238 |
| 2007/0147377 A1* | 6/2007 | Laroia et al. | 370/392 |
| 2009/0270027 A1* | 10/2009 | O'Neill | 455/15 |
| 2009/0303918 A1* | 12/2009 | Ma et al. | 370/315 |

\* cited by examiner

Modulation schemes considered

| MODULATION | CODE RATE | REQUIRED SINR (dB) | DATA RATE (Mbps) $r_i$ |
|---|---|---|---|
| QPSK | 1/2 | 6.6 | 6.0 |
| 16-QAM | 1/2 | 10.5 | 12.0 |
| 64-QAM | 2/3 | 15.3 | 24.0 |
| 64-QAM | 3/4 | 20.8 | 27.0 |

Simulation parameters used

| PARAMETER | VALUE |
|---|---|
| Frequency reuse | (1,6,6) |
| Cell size | 1000 m |
| BS antenna gain | 20 dBi |
| mBS antenna gain | 0 dBi |
| BS antenna height | 30 m |
| mBS antenna height | 15 m |
| SS antenna height | 2 m |
| Transmit power | 30 dBm |
| Power control | No |
| Large scale fading model | Erceg-Greenstein (Terrain A) |

INCORPORATION OF MESH BASE STATIONS IN A WIRELESS SYSTEM

FIELD OF THE INVENTION

The present invention relates to incorporating mesh base stations into a wireless network.

BACKGROUND OF THE INVENTION

FIG. 1 shows a generic mesh network 100 according to prior art. Generic wireless mesh network 100 (also referred as a client mesh network), includes nodes (subscriber stations) 101-117 in a wireless network forwarding traffic cooperatively over multiple radio links. Some of the participating nodes have wired connectivity to the Internet and hence serve as gateway nodes providing internet connectivity to the entire network. The architecture is economical when coverage, and not necessarily capacity, of the network is of primary concern. Mesh network 100 exemplifies a typical mesh network. Current commercial, community, and public safety mesh networks are typically compatible with WiFi®, which is based on the IEEE 802.11 standard. Commercial players include companies such as Motorola, Nokia, Microsoft, Tropos, Mesh Networks, BelAir, Nortel, FireTide, Propagate, Strix, Mesh Dynamics, MeshAP, MIT Rooftop, Rice TAPs. Examples of municipality WiFi mesh networks can be found in Urbana, Kingsbridge, Queensland, MuniWireless (France), Philadelphia, San Francisco, Seattle, Portland, Chicago. The proliferation of mesh networks has already started even though the current WiFi-based trends promise coverage rather than capacity.

With the ubiquity of wireless subscriber stations, there is a real need in the market place to expand wireless mesh architecture to a wireless system to increase the coverage and the traffic capacity of a wireless system.

BRIEF SUMMARY OF THE INVENTION

The present invention provides methods and apparatuses for incorporating and operating a mesh base station in a wireless network. The mesh base station may utilize common wireless resource allocations as a corresponding wireless base station.

With one aspect of the invention, a wireless base station and a mesh base station transmits to corresponding wireless subscriber stations during the same time period. As an example, the scheduling downlink mapping may be compatible with a frame structure that is supported by the IEEE 802.16 standard. Furthermore, either the wireless base station or the mesh base station may transmit to another wireless subscriber station during another time period of the frame structure.

With another aspect of the invention, a mesh base station obtains a data packet from a wireless base station over a backhaul link that corresponds to a scheduled time period. The mesh base station consequently transmits the data packet to the designated wireless subscriber station during another scheduled time period. The other scheduled time period may be a dedicated time period or a simultaneous time period.

With another aspect of the invention, a wireless base station and a mesh base station receives data packets from corresponding wireless subscriber stations during the same time period. Data packets may also be transmitted to the wireless subscriber stations either in a symmetric manner or an asymmetric manner.

With another aspect of the invention, a mesh base station may be reconfigured to support wireless traffic if a wireless base station goes out of service or exceeds a predetermined traffic load. In such scenarios, a backhaul link is established to another wireless base station.

With another aspect of the invention, a wireless network is configured with two mesh base stations at an approximate boundary of two adjacent sector coverage areas. Each sector coverage area is supported by a corresponding wireless base station. Each mesh base station supports wireless subscriber stations within a configured coverage radius and connects to one of the wireless base stations over a backhaul link.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein:

FIG. 9 shows examples of a modulation configurations in accordance with an embodiment of the invention;

FIG. 10 shows an example of simulation parameters in accordance with an embodiment of the invention;

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Definitions for the following terms are included to facilitate an understanding of the detailed description
- mesh base station—an infrastructure entity that wirelessly relays data to and from a corresponding wireless base station
- wireless resource allocation—a configurable wireless communication characteristic. Examples include frequency allocation (frequency division multiple access), code sequence allocation (code division multiple access), and time slot allocation (time division multiple access). Moreover, a wireless resource allocation may be specified as a combination of component resource allocations, e.g., a combination of frequency and time slot allocations.

Figure 1:
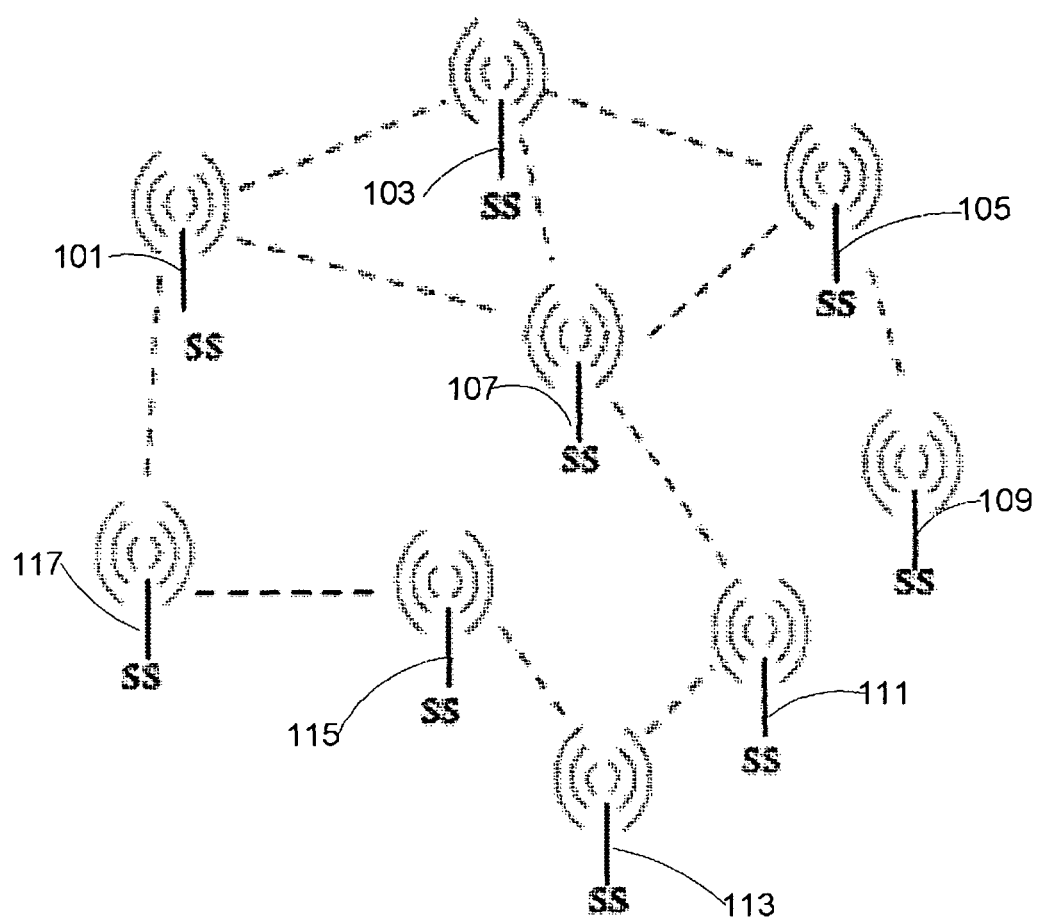
FIG. 1 shows a generic mesh network according to prior art.
Figure 2:
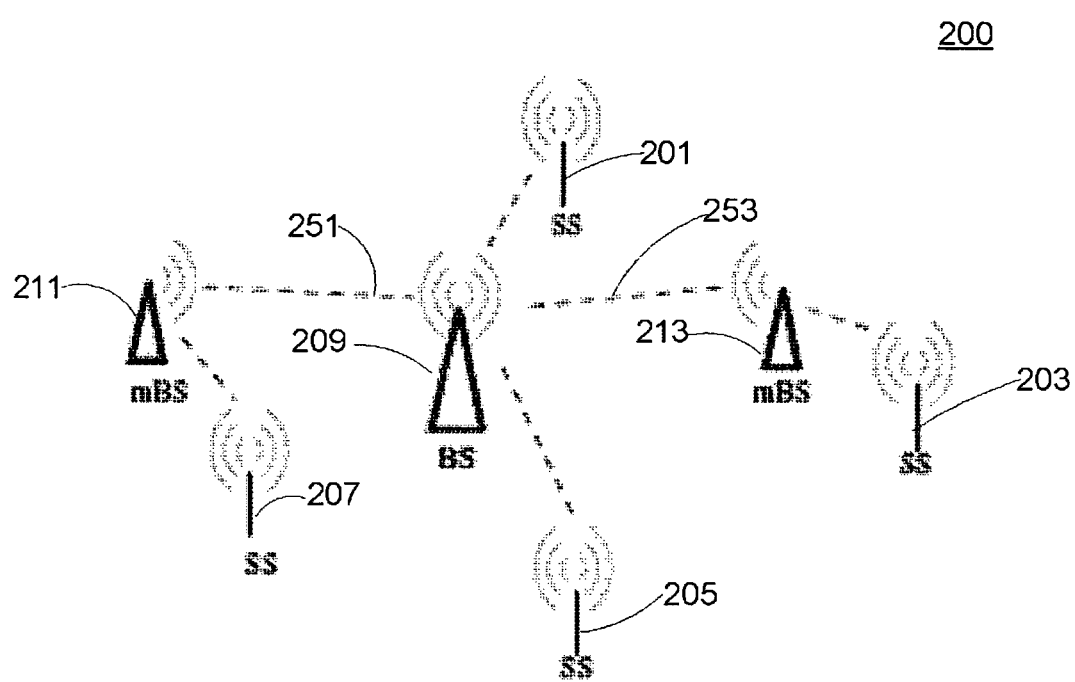
FIG. 2 shows a mesh network according to an embodiment of the invention.

FIG. 2 shows a mesh network 200 according to an embodiment of the invention. Mesh network 200 may be referred as an infrastructure mesh network because mesh base stations 211-213 are considered part of the wireless network with wireless base station 209. (In contrast, generic mesh network 100 comprises only wireless subscriber stations to support a wireless mesh network.) Mesh network 200 is fundamentally different from generic mesh network 100 because of the fact that additional mesh base stations (mBS) 211-213 are strategically deployed and controlled by wireless system 200 to wirelessly forward traffic from subscriber stations (SS) 203 and 207 to base station (BS) 209. The BS⇔mBS links 251 and 253 are referred as backhaul links. Additionally, SS 201 and SS 205 communicate directly with BS 209.

FIG. 2 depicts single cell in mesh network 200. A cell is defined as the area that around BS 209 such that any SS in the coverage area can connect to the Internet via the particular BS. Of course, cells may overlap thus allowing users to select among multiple possible base stations. Infrastructure mesh network 200 attempts to change the economics of micro-cell wireless networks by aggregating traffic for wired backhaul. Transmission cost for wired backhaul may be a significant cost in high capacity radio networks. Infrastructure mesh network 200 also may provide advantages over a client mesh network, e.g., generic mesh network 100. For example, security, predictability, and manageability may be facilitated since the mesh base stations 211-213 are centrally deployed and controlled. Unlike in a client mesh network, users do not forward (relay) any data packets. A user either directly communicates with BS 209 or communicates with mBS 211 or 213, which then subsequently forwards traffic to and from the BS 209. (Each communications link, as shown in FIG. 2 is bidirectional. The wireless subscriber station transmits to the wireless infrastructure on the uplink and receives from the wireless infrastructure on the downlink.)

Since mBS 211 or 213 is deployed by the wireless system 200, the mBS antenna is better placed than the antenna of a normal user and hence them BS⇔BS link is optimized to be a high-rate link. Moreover, mBS⇔SS links are typically shorter on average than mBS⇔BS links, thus requiring lesser transmission power and hence causing lesser interference to other users as well as other cells. Due to these lucrative advantages offered by an infrastructure mesh, most commercial WiFi mesh systems mentioned earlier are actually infrastructure mesh systems, i.e., the wireless system carefully deploys and controls the base stations.

According to embodiments of the invention, variations of infrastructure mesh network 200 may be supported. For example the BS⇔mBS backhaul 251 or 253 can use a different spectrum than the spectrum used for the SS⇔BS and the SS⇔mBS links. This may lead to an economic problem due to the requirement of extra spectrum. Moreover, once a particular spectrum is dedicated to backhaul link 251 or 253, the corresponding frequency spectrum cannot be used for other purposes, thus preventing flexible use of the spectrum. As a result, the economical choice corresponds to having backhaul link 251 or 253 share the same spectrum as that being used by the clients. This choice has several other advantages as well such as requiring the same type of radio technology on the wireless subscriber stations (clients) the BS, and the mBS. Since the spectrum is shared, there is a natural tendency to design for flexible and frugal use of the shared spectrum. Owing to these reasons, one chooses to analyze the later option, i.e., to analyze, in terms of capacity and outage, the performance of an infrastructure mesh with a single spectrum being shared by all links in a cell.

According to an embodiment of the invention, in order to proceed with an analysis, one may impose simplifying assumptions. First, one assumes the existence of a centralized medium access control (MAC) packet radio system 2 such as found in IEEE 802.16/WiMAX, CDMA EV-DO, UMTS-HSDPA, etc. (For example, BS 209, mBS 211, and mBS 213 control access while wireless subscriber stations 201-207 do not.) Second, one assumes that users are uniformly distributed in the analyzed area and that users always have backlogged data to send and receive, i.e., users have infinite bandwidth requirement. Finally, as a design principle, one imposes that the mBS support an infrastructure mesh need having "low complexity." This design principle has the following consequences:
- The mBS should be smaller than the BS
- The mBS should have a single radio to communicate with both the BS and subscribers
- The mBS should use an omni-directional antenna to communicate with the subscribers.

Consequently, one requires that an mBS (211,213) should have similar complexity as a SS (201-207), resulting in an mBS being as economical as wireless subscriber station. There may be some differences since mBS (211, 213) may require a directional antenna for backhaul link 251 or 253. However, mBS (211, 213) typically is able to use the same radio for communicating through either the omni-directional antenna or the directional antenna through simple switches.

Figure 3:
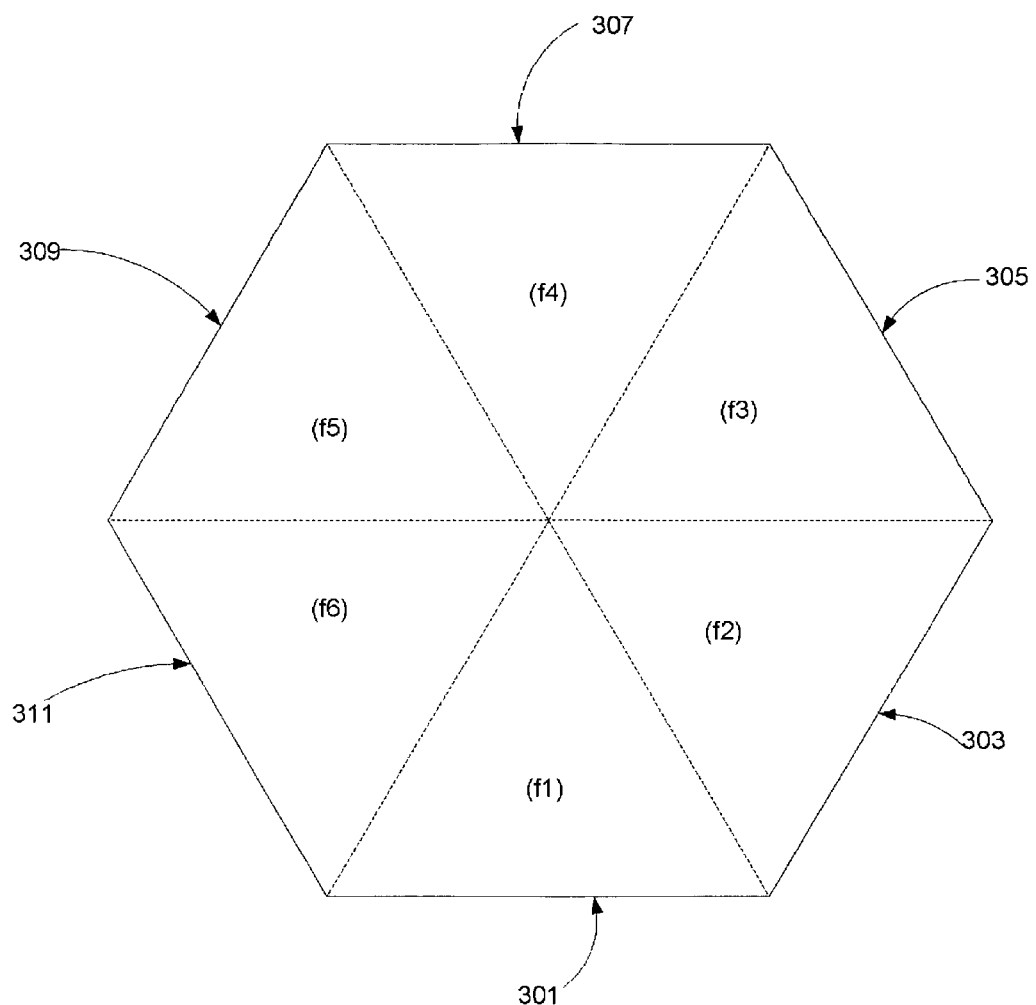
FIG. 3 shows sector frequency allocations of a wireless base station according to prior art.

FIG. 3 shows sector frequency allocations for a wireless base station according to prior art. FIG. 3 shows a conventional cell with six sectors 301-311, each using a different, non-interfering frequency spectrum. The BS is located at an approximate center of the cell and is assumed to have six different radios and correspondingly, six different directional antennas.

Figure 4:
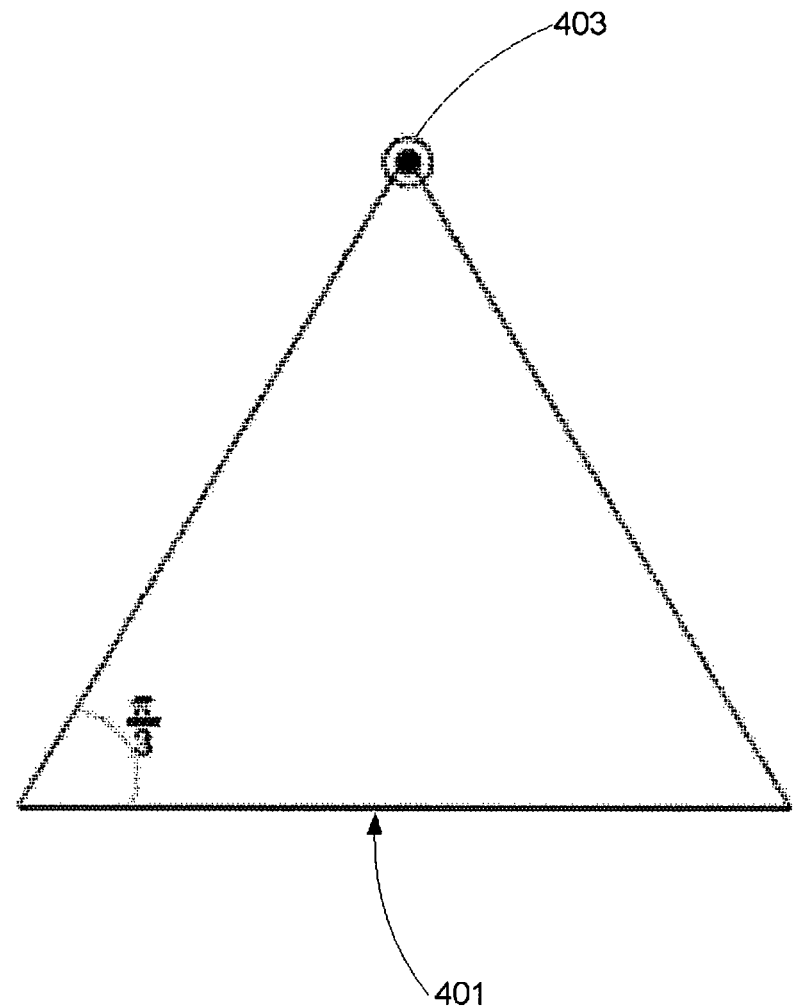
FIG. 4 shows a sector configuration of a wireless network according to prior art.

FIG. 4 shows a sector coverage area 401 of a wireless network that is supported by wireless base station according to prior art. Sector coverage area 401 corresponds to any of the six sector areas 301-311 as shown in FIG. 3.

Figure 5:
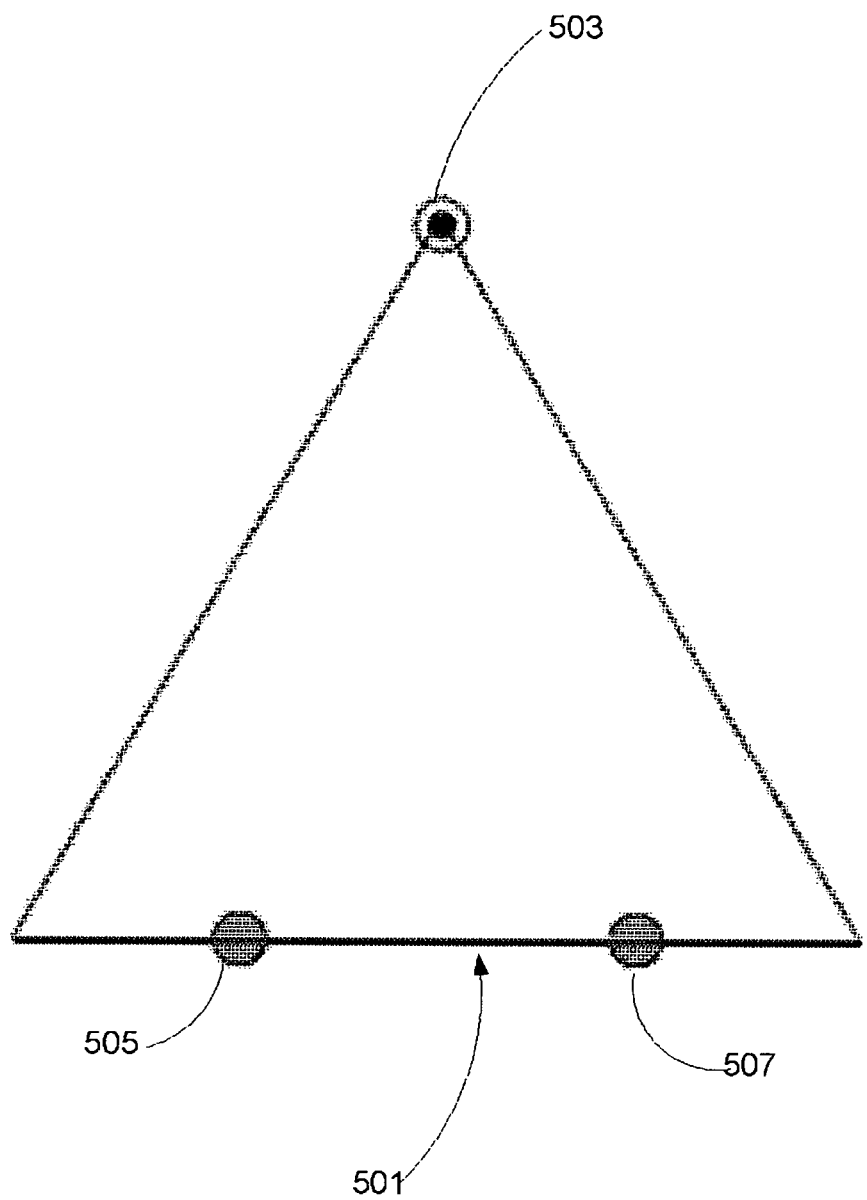
FIG. 5 shows a sector configuration of a wireless network according to an embodiment of the invention.

FIG. 5 shows a sector coverage area 501 that is supported by wireless base station 503 according to an embodiment of the invention. Mesh base stations 505 and 507 are incorporated at an approximate boundary of sector coverage area 501. Consequently, mesh base stations 505 and 507 are farthest from wireless base station 503 in a region where base station 503 typically has the worst transmission characteristics. Moreover, wireless subscriber stations (nodes, not shown) at the extremities in a conventional sector need to transmit at a higher power, thus causing higher interference. The placement of a mesh base station at the base of the triangle representing a sector helps alleviate both issues. Instead of placing just one mesh base station at the middle of the base of the triangle, an embodiment of the invention places two mBS's 505 and 507 symmetrically in order to cover the entire base of the triangle. A single mBS may require the antenna pattern of the mBS to be contorted, resulting in complex antennas that are costly to build. Given the corresponding model, one wishes to analyze whether simultaneous use of spectrum by two different subscriber stations is feasible. If indeed it is possible to simultaneously schedule two users, one to wireless base station 503 and the other to one of the mesh base stations 505 or 507, then one expects a throughput gain for the sector.

Figure 6:
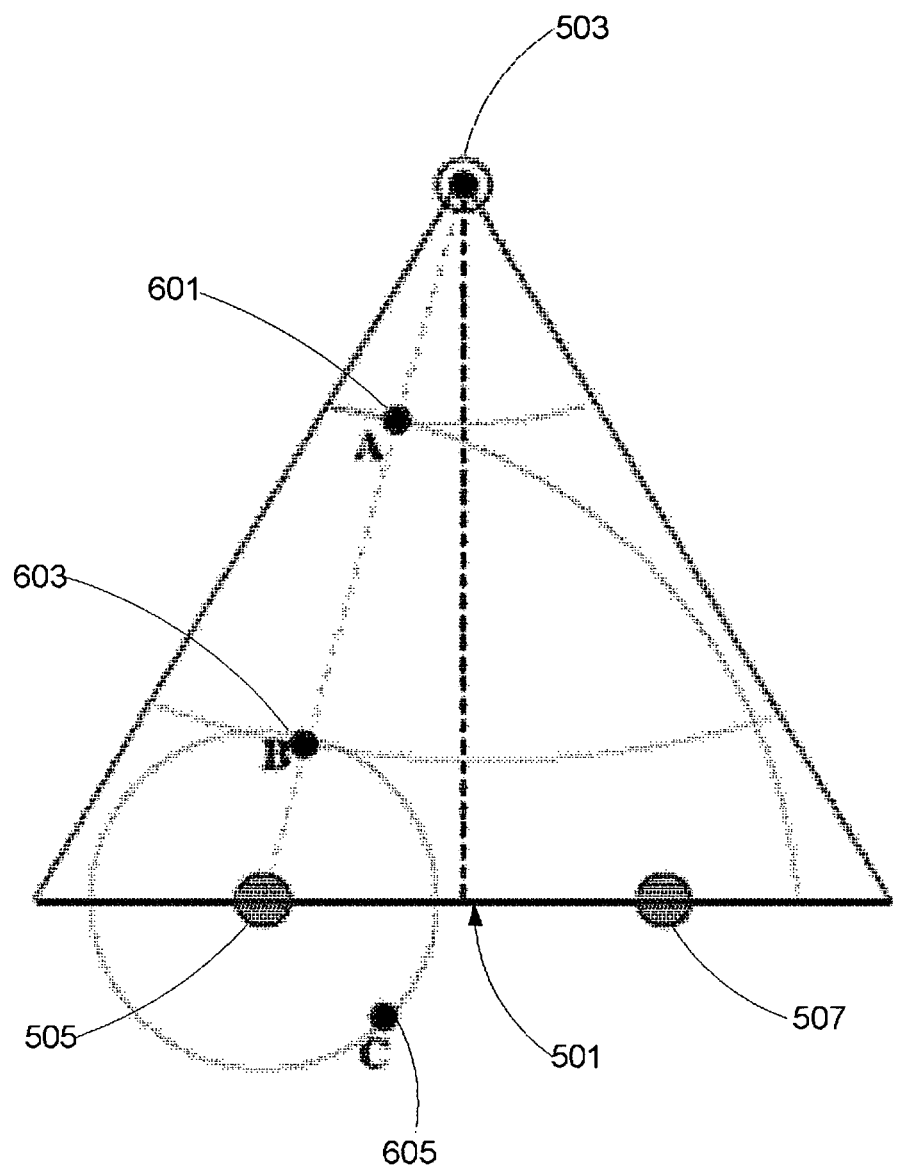
FIG. 6 shows simultaneous scheduling in a sector of a wireless network according to an embodiment of the invention.

FIG. 6 shows simultaneous scheduling in sector coverage area 501 of a wireless network according to an embodiment of the invention. For example, wireless subscriber station (node A) 601 can be scheduled to receive from BS 503 at the same time period as wireless subscriber station (node B) 603 or wireless subscriber station (node C) 605 is scheduled to receive from mBS 505. This is because the interference from the mBS 505 at node A 601 is sufficiently attenuated and hence the Signal-to-Noise-and-Interference-Ratio (SINR) at node A 601 is sufficient for correct reception from BS 503. Similarly, the SINR at node B 603, even in the presence of interference from BS 503, is sufficient for satisfactory reception from mBS 505. Node C 605, even though not located in sector coverage area 501, may be supported by mBS 505 because node C 605 is within a coverage radius of mBS 505.

Figure 7:
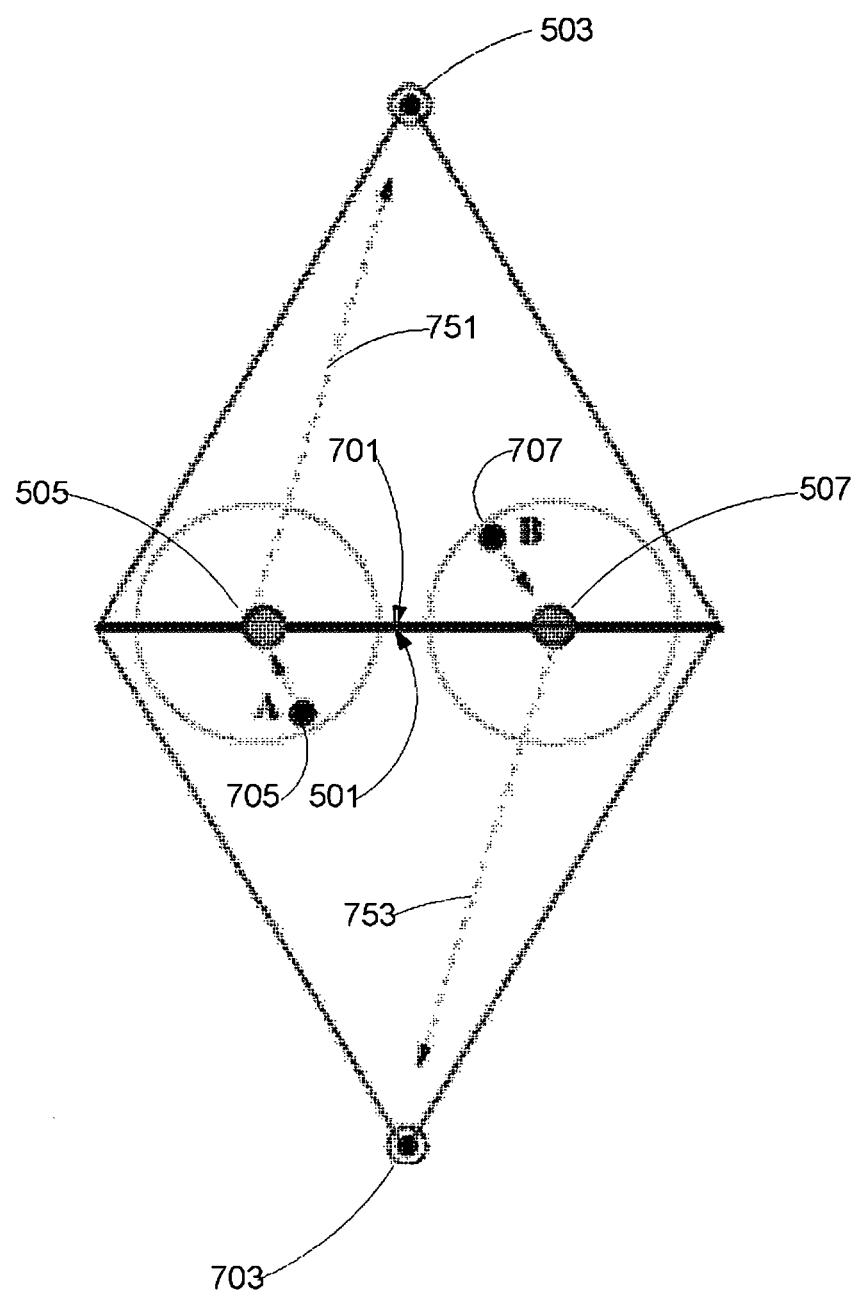
FIG. 7 shows an adjacent sector configuration of a wireless network according to an embodiment of the invention.

FIG. 7 shows adjacent sector coverage areas 501 and 701 of a wireless network according to an embodiment of the invention. Referring to FIG. 6, one may select node C 605 rather than node B 603 to be scheduled simultaneously with node A 601. The SINR at node C 605 is typically higher than the SINR at node B 603 since BS 503 is farther away from node C 605 than BS 503 is from node B 603. As a result, instead of analyzing just the single sector, one is motivated to analyzing a coverage area comprising two adjacent sector coverage areas as shown in FIG. 7.

Adjacent sector coverage areas 501 and 701 are assigned different frequency spectra. Mesh base station 505 communicates with BS 503 over backhaul link 751 even though many of the served users (e.g., node A 705) may actually be located in the lower sector (sector coverage area 701). Similarly, the mBS 507 may serve users (e.g., node B 707) which are located in the upper sector (sector coverage area 501) even though mBS 507 communicates with BS 703 over backhaul link 753.

Figure 8:
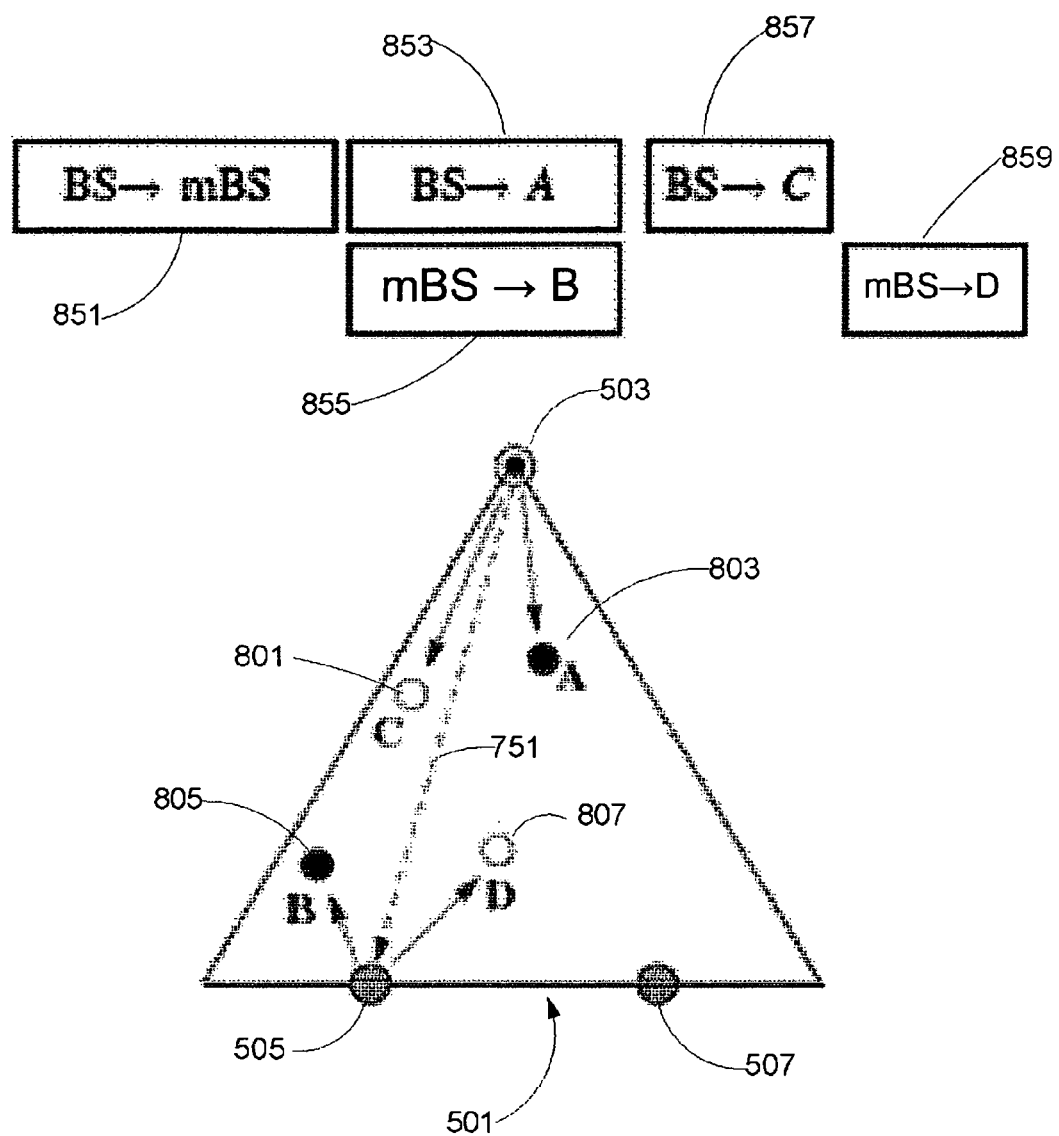
FIG. 8 shows an example downlink scheduling in a sector according to an embodiment of the invention.

FIG. 8 shows an example downlink scheduling in sector coverage area 501 according to an embodiment of the invention. A pair of wireless subscriber stations (e.g., node B 805 and node A 803) is identified for simultaneous scheduling of communications with BS 503 and mBS 505. FIG. 8 shows an exemplary downlink scheduling frame (comprising data packets 851-859) which is compatible with the frame structure currently used in IEEE 802.16. Nodes A and B 803 and 805 are simultaneously scheduled to receive from BS 503 and mBS 505, respectively. Nodes C and D 801 and 807 are dedicatedly scheduled to receive from BS 503 and mBS 859, respectively. The downlink frame contains the following periods:

Backhaul period (corresponding to data packet 851): In this period the data is forwarded from the BS to the mBS using the backhaul link. This data is meant for node B and D.

Simultaneous Schedule period (corresponding to data packets 853 and 855): In this period the BS transmits data to node A and at the same time the mBS forwards the data meant for B that the mBS received in the immediately preceding backhaul period.

Dedicated Schedule period (corresponding to data packets 857 and 859): This period consists of two consecutive periods. In the first part the BS transmits data to node C and in the second part the mBS forwards data to node D.

While the above example illustrates transmission on the downlink (from the infrastructure to the wireless subscriber station), transmission may be scheduled on the uplink (from the wireless subscriber station to the infrastructure).

FIG. 9 shows an example of a modulation scheme 900 in accordance with an embodiment of the invention. FIG. 9 shows different modulation schemes that may be used and the corresponding SINR thresholds and transmission rates, corresponding to different modulation configurations. In an embodiment, modulation scheme 905 (64-QAM) is used for the BS⇌mBS backhaul link (e.g., links 751 and 753 as shown in FIG. 7).

FIG. 10 shows an example of simulation parameters in accordance with an embodiment of the invention. The remaining parameters used for the simulation are shown in FIG. 10. In an embodiment of the invention, the Erceg-Greenstein model is used as the large scale fading model and most of the results are shown for terrain A of the Erceg-Greenstein model. Terrain A is representative of areas with moderate to heavy tree density. Simulations with the other terrain types were performed with similar results.

Figure 11:
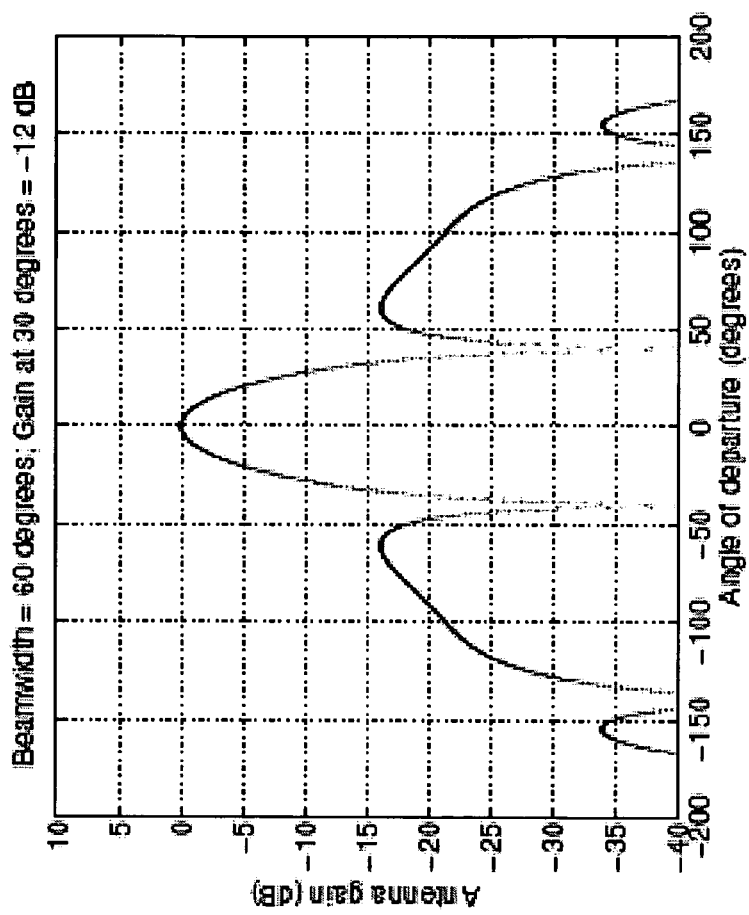
FIG. 11 shows a directional antenna pattern in accordance with an embodiment of the invention.

FIG. 11 shows a directional antenna pattern used for the antenna at wireless base stations 503 and 703 (as shown in FIG. 7) in accordance with an embodiment of the invention. Mesh base stations 505 and 507 and wireless subscriber stations 705-707 utilize omni directional antennas. The directional antenna at BS (503, 703) has a beamwidth of 30 degrees. The gain at an angle of departure of 0 degrees from the azimuth of the directional antenna, i.e., the peak gain of the antenna, is 0 dBi and the gain at an angle of departure of 30 degrees is −12 dBi. Since one assumes an antenna gain of 20 dBi, the corresponding effective gains are 20 dBi and 8 dBi, respectively.

Figure 12:
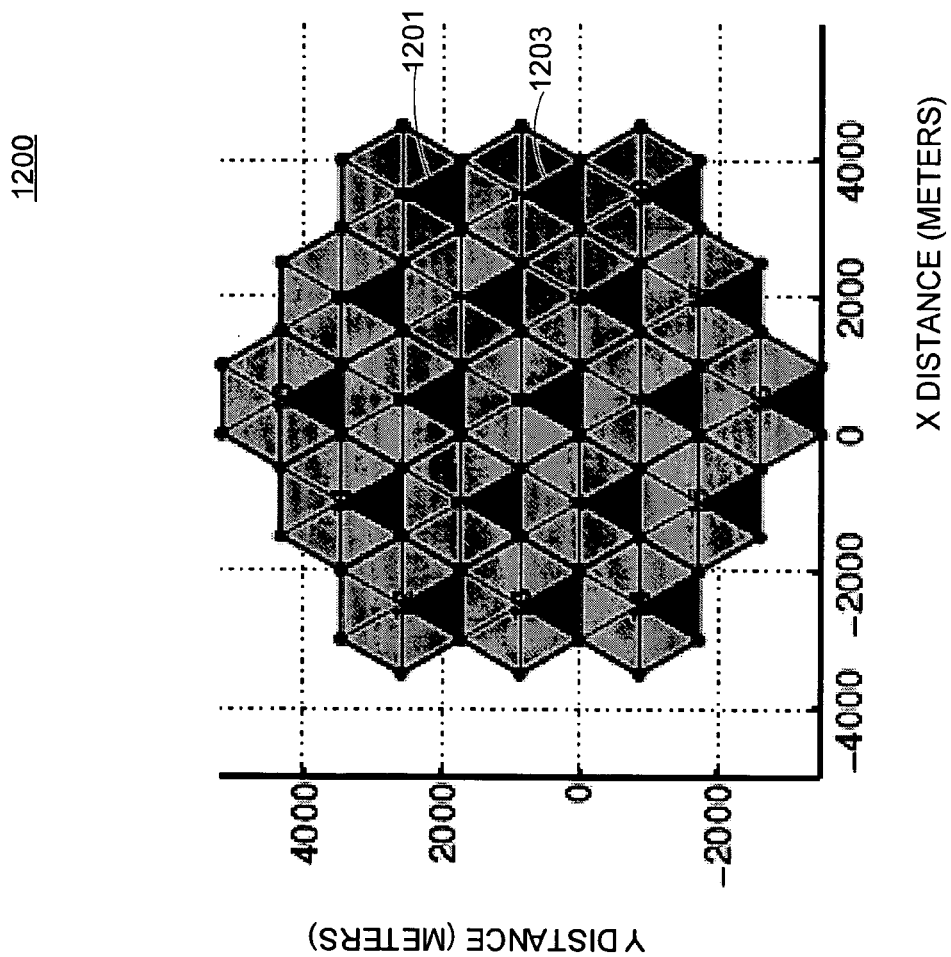
FIG. 12 shows a multicell configuration in accordance with prior art.

FIG. 12 shows a multicell configuration 1200 in accordance with prior art. In the scatter plots shown in FIGS. 14 and 15, sector coverage areas 1201 and 1203 are assigned the same frequency spectrum. In the analysis of the downlink throughput and coverage, interference from cells which are at most two cells away from the analyzed sector is considered.

Figure 13:
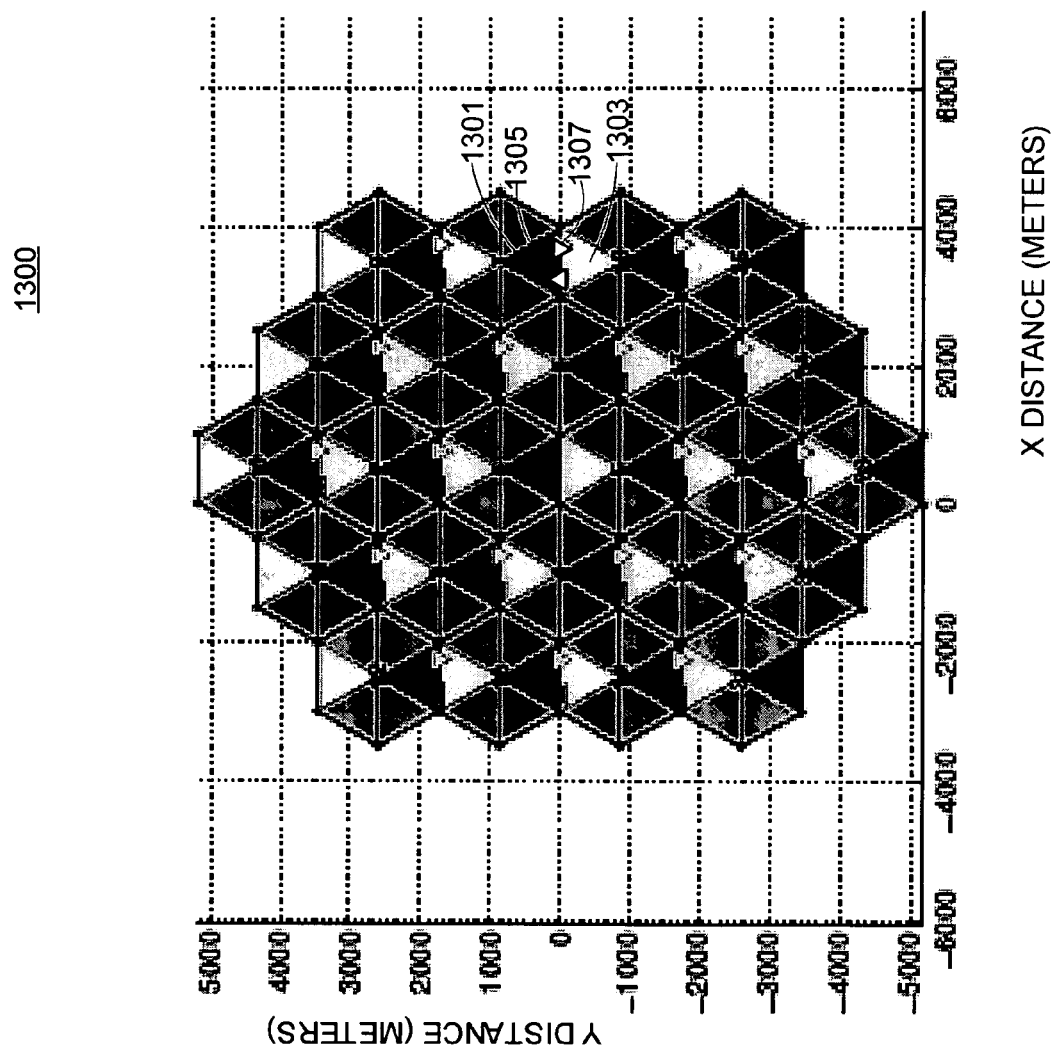
FIG. 13 shows a multicell configuration in accordance with an embodiment of the invention.

FIG. 13 shows a multicell configuration 1300 in accordance with an embodiment of the invention. In the scatter plots shown in FIGS. 16-19, downlink performance is determined in the presence of mesh base stations 1305 and 1307 serving sector coverage areas 1301 and 1303. In the analysis, the wireless system has a (1,6,6) spectrum configuration (corresponding each cell being assigned the same frequency spectrum, each cell being divided into 6 sectors, and each sector having a corresponding frequency allocation.) As will be discussed in FIGS. 16-19, the improvement in the mesh system in terms of coverage and throughput more than compensates for the radio resources that are diverted towards the mBS⇆BS backhaul. The mesh base station is designed to be simple and hence cost effective, thus not creating any economic hurdle in their deployment. Simulations have shown a coverage improvement of around 80% whereas the sector throughput increases from 16 Mbps to 21 Mbps. In addition, embodiments of the invention may support power control so that transmissions are made at the optimum power required for a particular SINR to be achieved between the transmitter and the receiver. One consequently expects a decrease of inter-cell interference caused by wireless subscriber stations at the periphery of a cell.

Embodiments of the invention also support uplink scheduling, which may be symmetric or asymmetric with respect to downlink scheduling. For example, a wireless subscriber station may communicate during different time periods for the uplink and the downlink. Also, a wireless subscriber station may communicate with a mesh base station in one direction and directly communicate with a wireless base station in the other direction.

Figure 14:
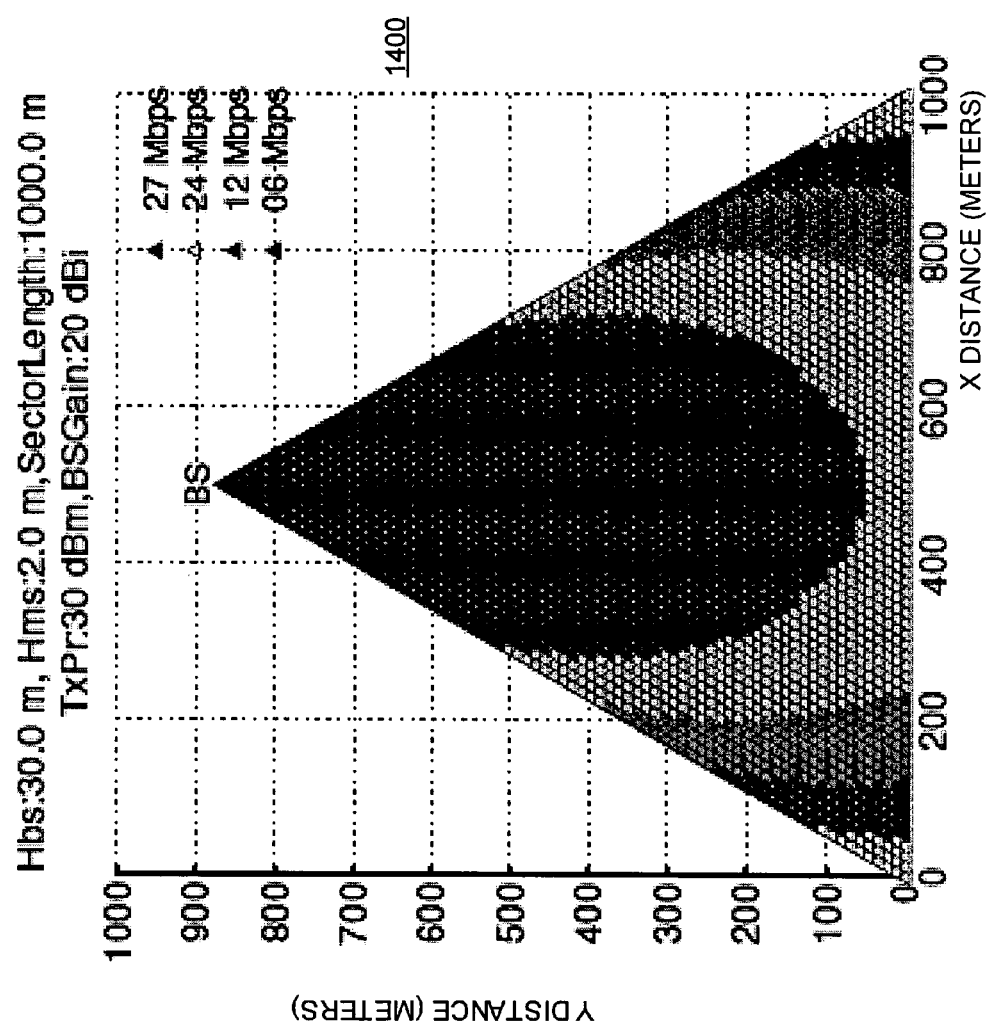
FIG. 14 shows a scatter plot without a log normal distribution in accordance with prior art.
Figure 15:
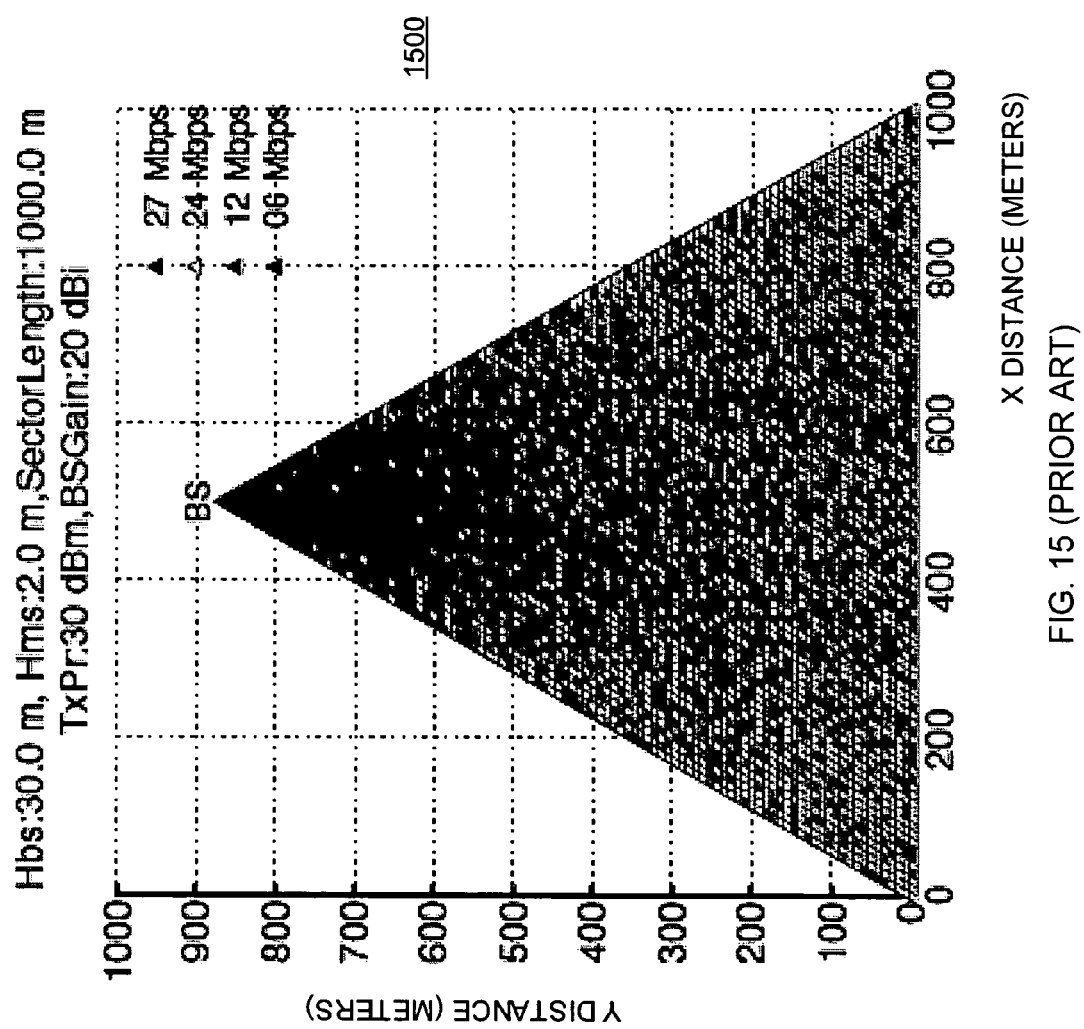
FIG. 15 shows a scatter plot with a log normal distribution in accordance with prior art.

FIG. 14 shows a scatter plot 1400 without a log normal distribution in accordance with prior art. FIG. 15 shows a scatter plot 1500 with a log normal distribution in accordance with prior art. (Scatter plots 1400 and 1500 correspond to multi-cell configuration 1200 as shown in FIG. 12.) With scatter plot 1400 no log normal variation was applied to the path loss, while with scatter plot 1500 log normal variation was applied to the path loss.

Figure 16:
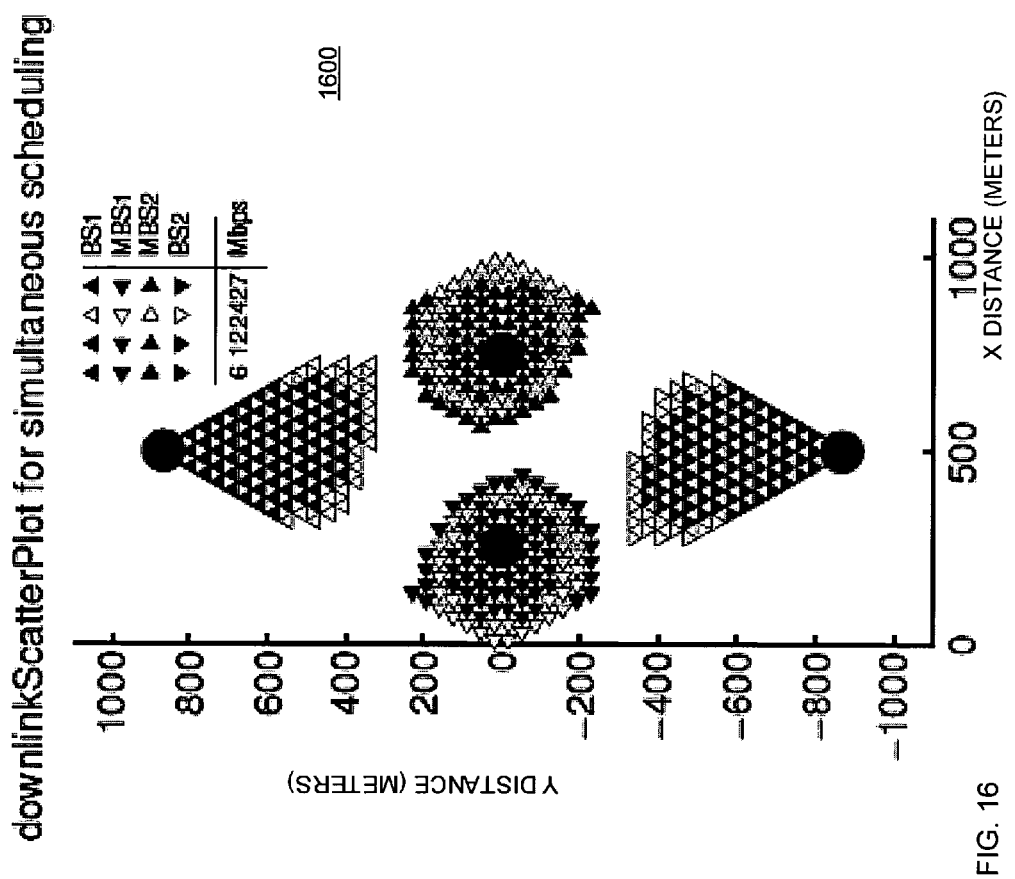
FIG. 16 shows a downlink scatter plot for simultaneous scheduling without a log normal distribution in accordance with an embodiment of the invention.
Figure 17:
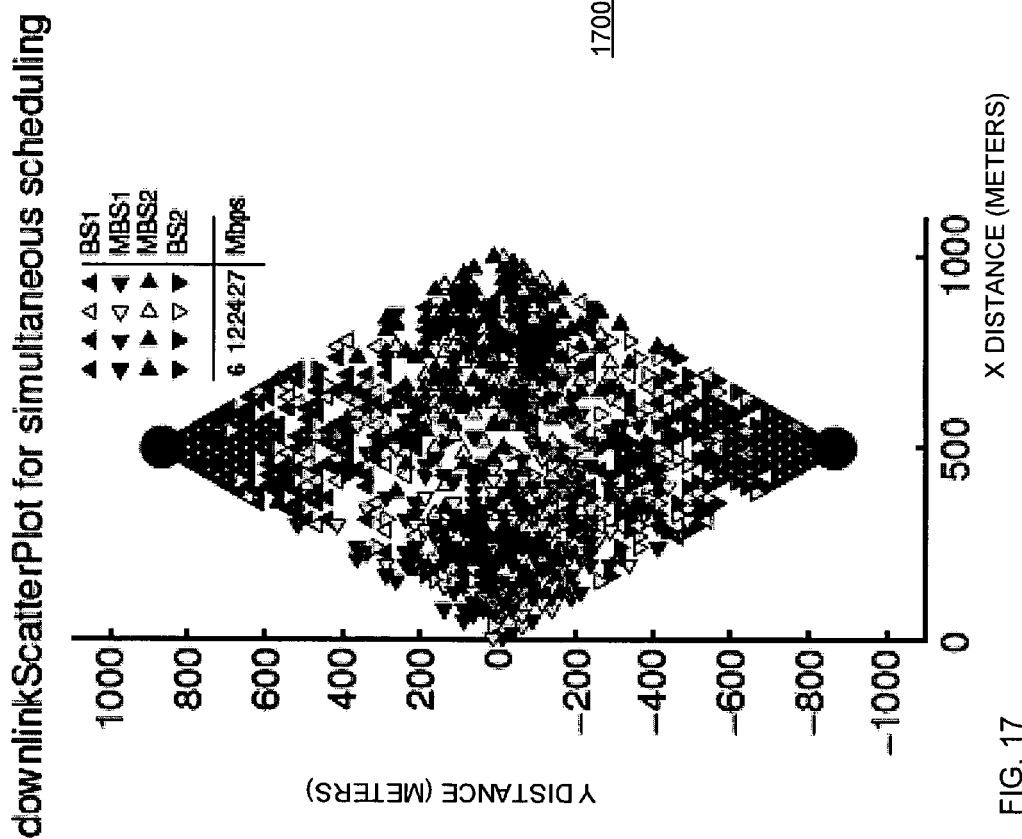
FIG. 17 shows a downlink scatter plot for simultaneous scheduling with a log normal distribution in accordance with an embodiment of the invention.
Figure 18:
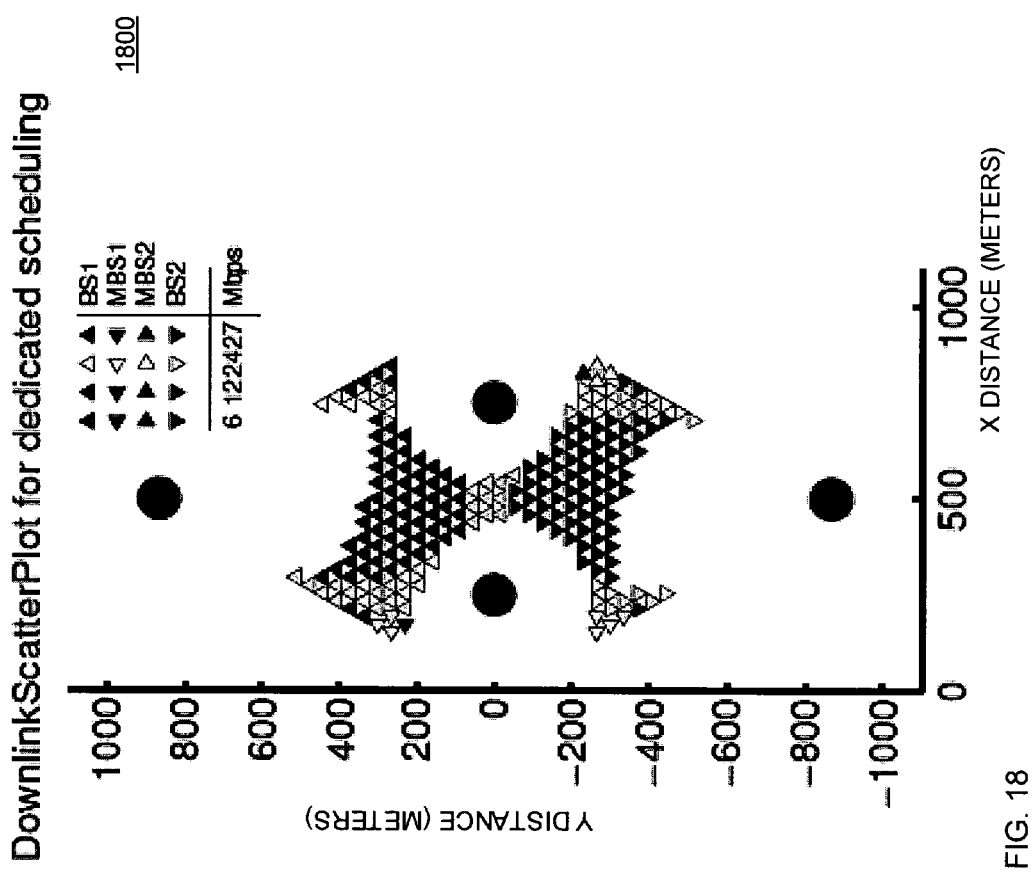
FIG. 18 shows a downlink scatter plot for dedicated scheduling without a log normal distribution in accordance with an embodiment of the invention.
Figure 19:
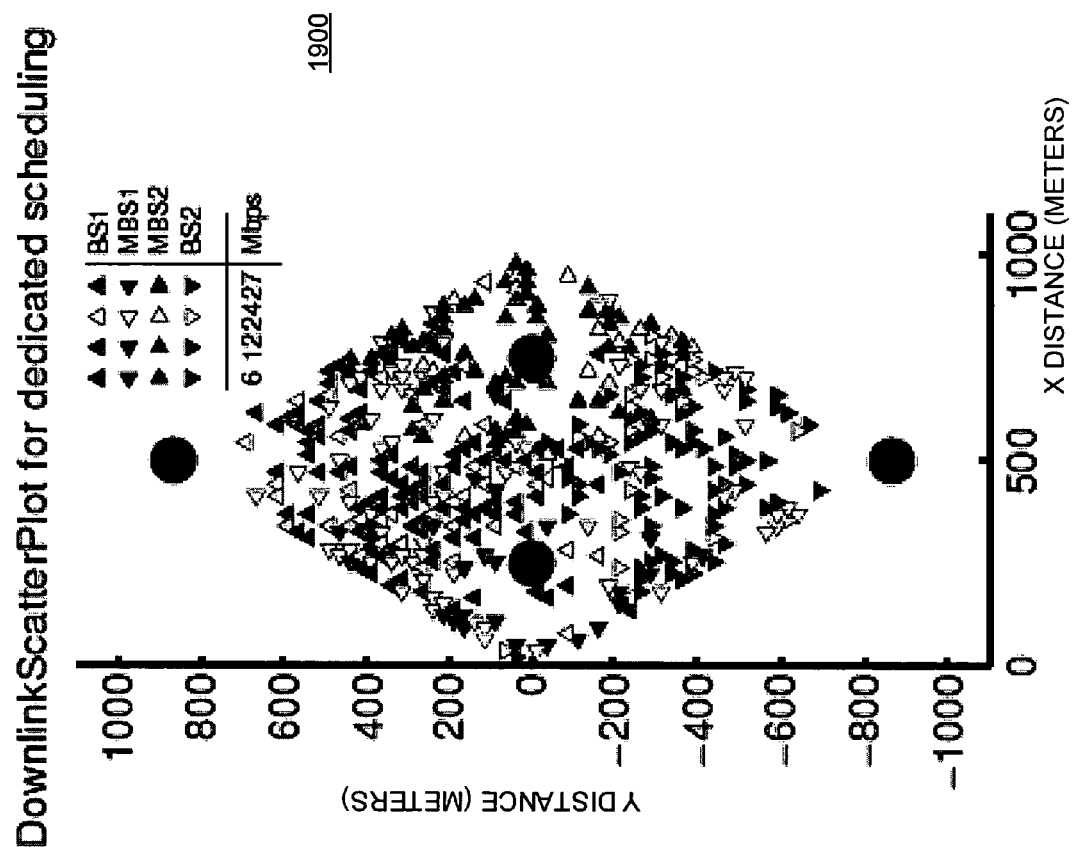
FIG. 19 shows a downlink scatter plot for dedicated scheduling with a log normal distribution in accordance with an embodiment of the invention.

FIGS. 16-19 show the points which can be simultaneously scheduled in the presence of mesh base stations and points which require dedicated scheduling. FIG. 16 shows a downlink scatter plot 1600 for simultaneous scheduling without a log normal distribution in accordance with an embodiment of the invention. FIG. 17 shows a downlink scatter plot 1700 for simultaneous scheduling with a log normal distribution in accordance with an embodiment of the invention. FIG. 18 shows a downlink scatter plot 1800 for dedicated scheduling without a log normal distribution in accordance with an embodiment of the invention. FIG. 19 shows a downlink scatter plot 1900 for dedicated scheduling with a log normal distribution in accordance with an embodiment of the invention. (Scatter plots 1600, 1700, 1800, and 1900 correspond to multi-cell configuration 1300 as shown in FIG. 1300.) FIGS. 16 and 18 show the scatter plots when no log normal variation is used to calculate path loss. FIGS. 17 and 19 show scatter plots in which log normal variation in path loss is included. (One expects that a log normal variation in the path loss provides results that better approximate an actual situation.) As a result there is no clear demarcation between the region which requires simultaneous scheduling and the region which requires dedicated scheduling as shown in FIGS. 17 and 19. However, this demarcation is clearly visible in FIGS. 16 and 18.

Figure 20:
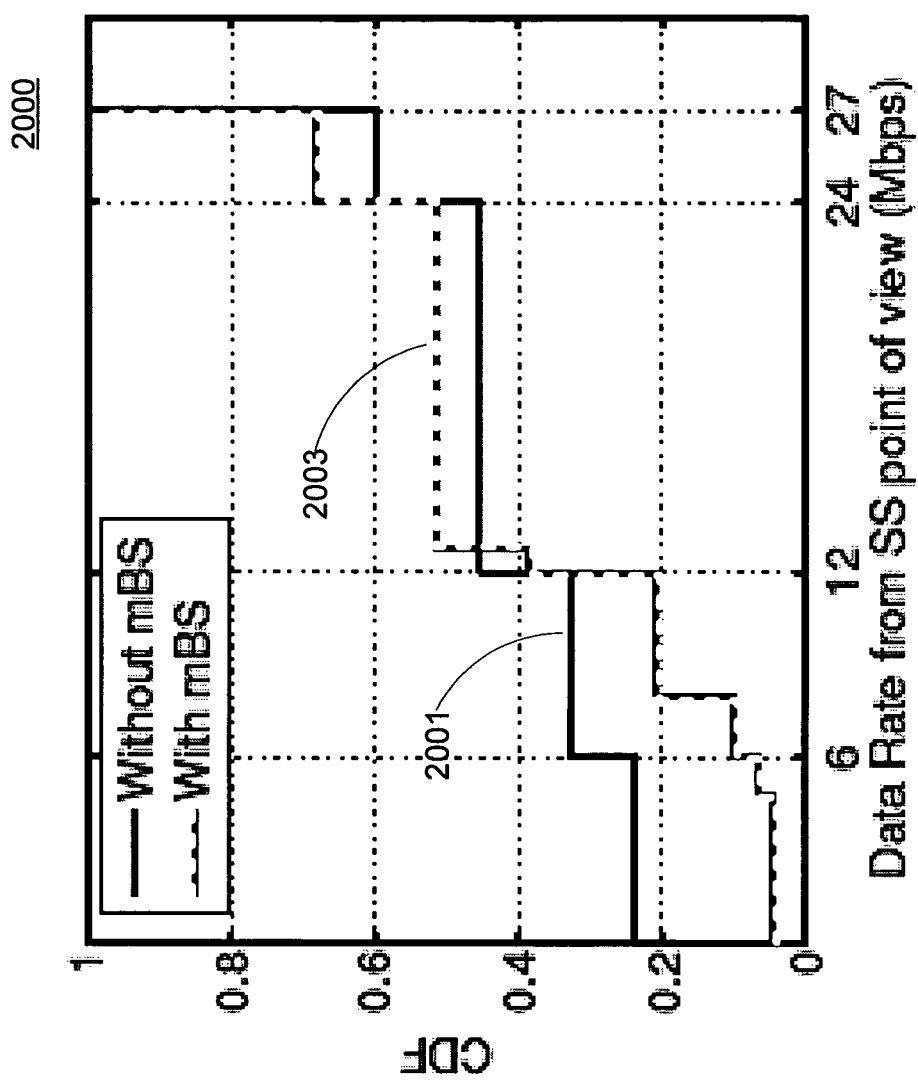
FIG. 20 shows a cumulative density function of data rates for wireless subscriber stations in accordance with an embodiment of the invention.

FIG. 20 shows a cumulative density function (CDF) 2000 of data rates for wireless subscriber stations in accordance with an embodiment of the invention. Even though the actual transmission rates are as shown in FIG. 9, CDF plot 2000 for the data rates in the presence of mesh base stations has transitions that do not match with the transmission rates shown in FIG. 9. This observation results when a wireless subscriber station communicates with a wireless base station via mesh base station, in which the actual data rate that the wireless subscriber station encounters is less than the transmission rate that the wireless subscriber station is able to transmit or receive at. Correspondingly, data must be transmitted over the backhaul link, during which time no other transmission can be performed in the sector (e.g., the scheduling as shown in FIG. 8). FIG. 20 suggests that a large number of wireless subscriber stations that were not able to communicate in the conventional case (corresponding to multi-cell configuration 1200 as shown in FIG. 12) are able to do so in the presence of mesh base stations (corresponding to multi-cell configuration 1300 as shown in FIG. 13).

Figure 21:
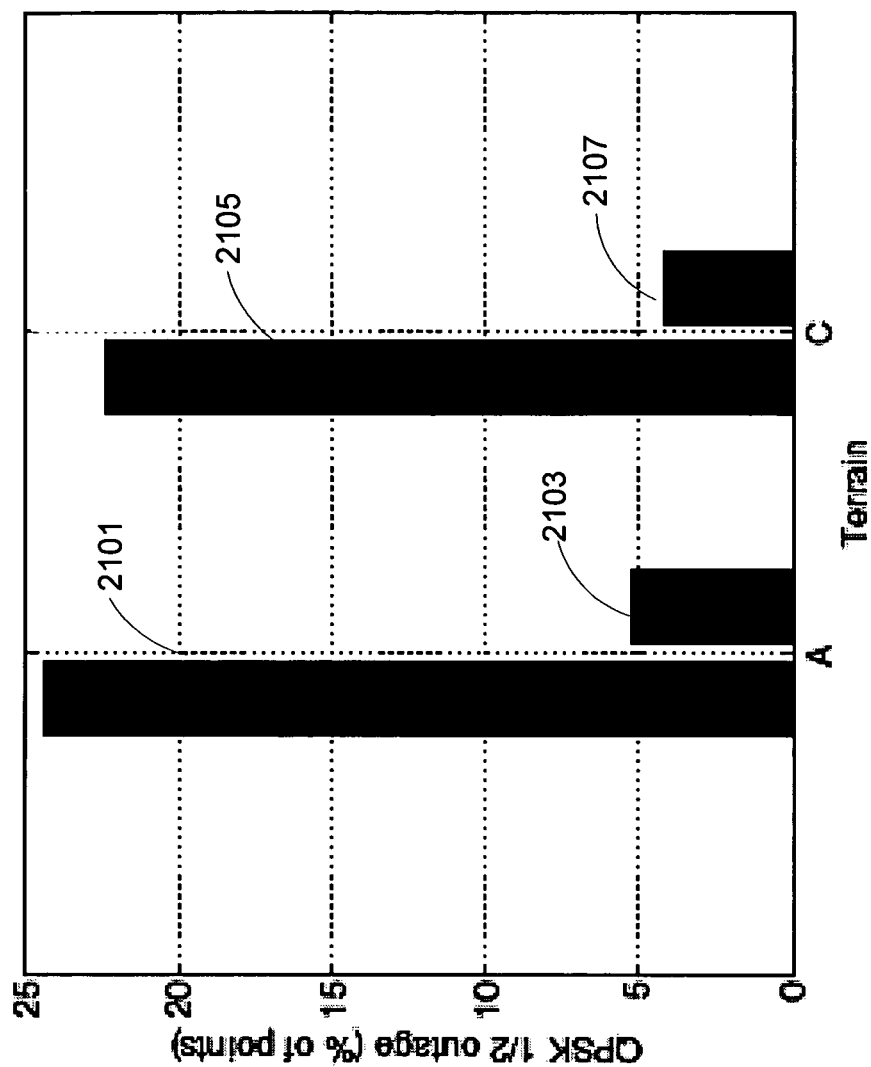
FIG. 21 shows an outage rate for wireless subscriber stations in accordance with an embodiment of the invention.
Figure 22:
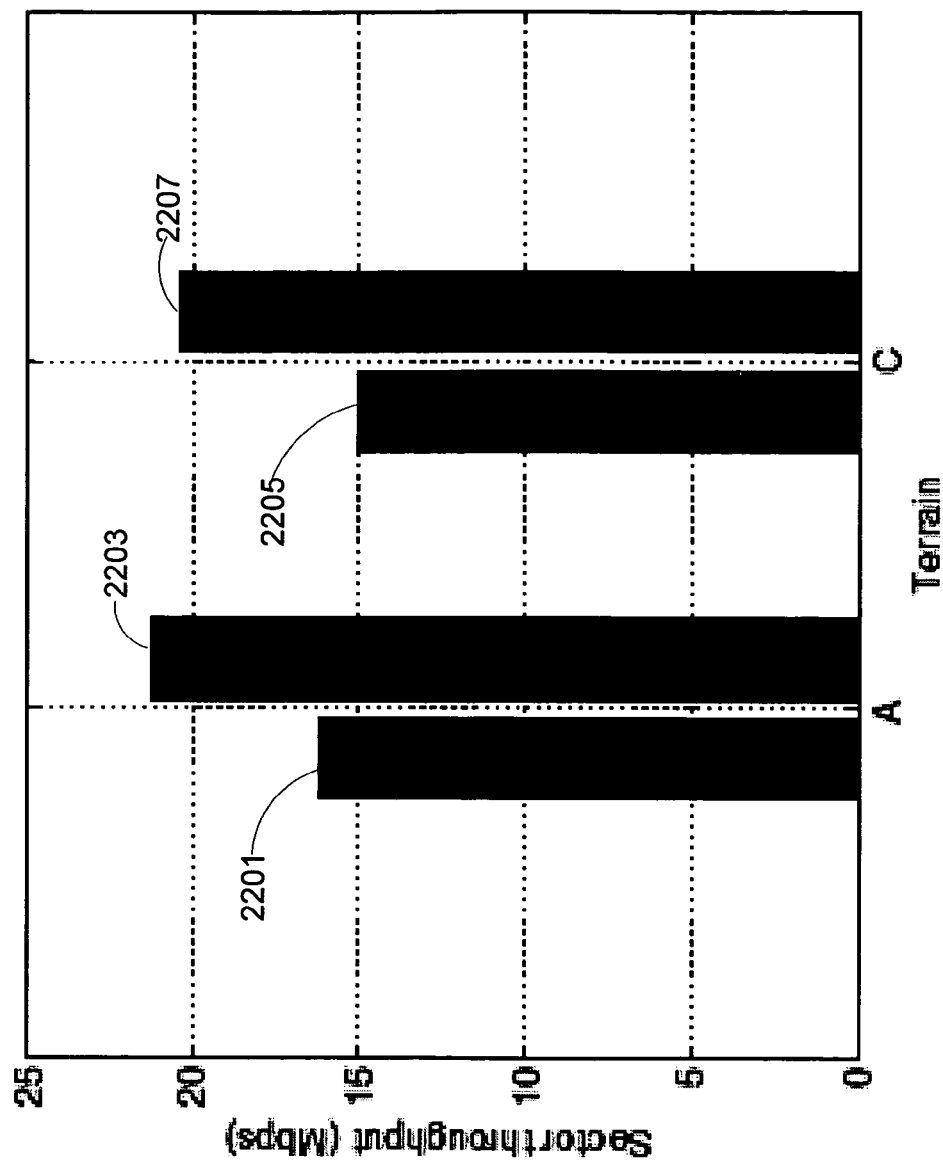
FIG. 22 shows a sector throughput for a wireless system in accordance with an embodiment of the invention.

FIG. 21 shows an outage rate for wireless subscriber stations using a QPSK ½ modulation scheme in accordance with an embodiment of the invention. One observes a significant decrease in the outage rate comparing a configuration without mesh base stations (rates 2101 and 2105) to a configuration with mesh base stations (rates 2103 and 2107). FIG. 22 shows a corresponding sector throughput for a wireless system in accordance with an embodiment of the invention. One observes an increase of the sector throughput comparing a configuration without mesh base stations (data throughputs 2201 and 2205) to a configuration with mesh base stations (data throughputs 2203 and 2207).

Embodiments of the invention support operational scenarios in which a wireless base station goes out of service. As an example, refer to the wireless network as shown in FIG. 7. As previously discussed, mesh base station 505 communicates with wireless base station 503 over backhaul link 751, and mesh base station 507 communicates with wireless base station 703 over backhaul link 753. If wireless base station 503 goes out of service, then mesh base station 505 establishes a backhaul link to wireless base station 703 and may also expand its coverage into sector coverage area 501. (The backhaul link may be established in a number of ways. For example, a directional communication path may be established between mesh base station 505 and wireless base station 703. Alternatively, another time period may be scheduled for backhauling between mesh base station 505 and wireless base station 703.) Traffic for wireless subscriber stations within the coverage radius of mesh base station 505 are consequently diverted to wireless base station 703.

Embodiments of the invention also support operational scenarios in which a wireless base station exceeds a predetermined level of traffic (i.e., overload). As an example, refer to the wireless network as shown in FIG. 7. As previously discussed, mesh base station 505 communicates with wireless base station 503 over backhaul link 751, and mesh base station 507 communicates with wireless base station 703 over backhaul link 753. If wireless base station 503 exceeds a predetermined traffic limit, then mesh base station 505 establishes a backhaul link to wireless base station 703 so that traffic can be diverted wireless base station 503. In such a scenario, traffic for wireless subscriber stations within the coverage radius of mesh base station 505 is consequently supported by wireless base station 703. Moreover, the coverage radius of mesh base station 505 may be adjusted to change the number of wireless subscriber stations that are diverted from wireless base station 503 to wireless base station 703. The coverage area of mesh base station 505 may be adjusted by adjusting the transmit power level and/or receive sensitivity.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry. Other hardware approaches such as DSP (digital signal processor) and FPGA (field programmable gate array) may also be used to implement the exemplary embodiments.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method, comprising:
sending, by a wireless base station device during a backhaul period preceding a scheduling period, a first wireless signal comprising first data directed to a mesh base station device for facilitating a transmission by the mesh base station device during the scheduling period via a resource of a wireless resource allocation, of a second wireless signal comprising the first data directed to a first wireless subscriber device, wherein the backhaul period is associated with communications corresponding to a backhaul link between the wireless base station device and the mesh base station device;
sending, by the wireless base station device during the scheduling period based on the resource of the wireless resource allocation, a third wireless signal comprising second data different than the first data, wherein the sending the third wireless signal is directed to a second wireless subscriber device;
determining, by the wireless base station device, traffic load data; and
sending, by the wireless base station device, the traffic load data directed to the mesh base station device for facilitating a change of a transmit power of the mesh base station device as a function of the traffic load data.

2. The method of claim 1, further comprising:
receiving, by the wireless base station device from the mesh base station device during another scheduling period, a fourth wireless signal comprising third data associated with the first wireless subscriber device.

3. The method of claim 1, wherein the wireless resource allocation represents an allocation of a frequency.

4. The method of claim 1, wherein the wireless resource allocation represents an allocation of a time slot.

5. A method, comprising:
initiating, by a system comprising a processor, a first wireless transmission of a first data packet between a mesh base station device and a wireless base station device during a first time period;
initiating, by the system, a second wireless transmission of the first data packet between the mesh base station device and a first wireless subscriber device during a second time period via a resource of an assigned resource allocation, wherein the second time period is after the first time period;
initiating, by the system, a third wireless transmission of a second data packet between the wireless base station device and a second wireless subscriber device during the second time period based on the resource of the assigned resource allocation, wherein the second data packet is different than the first data packet;
initiating, by the system, a determination of a traffic load of the wireless base station device; and
in response to initiating a transfer of information representing the traffic load, initiating, by the system, a change of a transmit power of the mesh base station device based on the traffic load data.

6. The method of claim 5, further comprising:
initiating, by the system, a fourth wireless transmission of a third data packet between the mesh base station device and the first wireless subscriber device; and
initiating, by the system, a fifth wireless transmission of the third data packet between the mesh base station device and the wireless base station device.

7. The method of claim 5, further comprising:
facilitating, by the system, a reception, by the mesh base station device, of a set of traffic load data for the wireless base station device; and
facilitating, by the system, a modification of a sensitivity value of the mesh base station device relating to a sensitivity of reception of signals by the mesh base station device based on the set of traffic load data.

8. The method of claim 5, wherein the assigned resource allocation represents an allocation of a frequency.

9. The method of claim 5, wherein the assigned resource allocation represents an allocation of a time slot.

10. A system comprising:
a memory to store instructions; and
a processor, coupled to the memory, that facilitates execution of the instructions to perform operations, comprising:
facilitating a first wireless transfer of a first data packet between a first mesh base station device and a first wireless base station device during a first period;
facilitating a second wireless transfer of the first data packet between the first mesh base station device and a first wireless subscriber device utilizing a first wireless resource allocation during a second period succeeding the first period;
facilitating a third wireless transfer of a second data packet between the first wireless base station device and a second wireless subscriber device utilizing the first wireless resource allocation during the second period; and
facilitating a first transfer of first data between a second mesh base station device and a second wireless base station device during the first period, wherein the second mesh base station device is positioned with respect to the first mesh base station device within a defined distance from a determined boundary between a first sector coverage area associated with the first wireless base station device and a second sector coverage area associated with the second wireless base station device.

11. The system of claim 10, wherein the operations further comprise:
facilitating a second transfer of the first data between the second mesh base station device and a third wireless subscriber device during the second period utilizing a second wireless resource allocation.

12. The system of claim 11, wherein the first wireless resource allocation comprises a first code sequence allocation, and wherein the second wireless resource allocation comprises a second code sequence allocation.

13. The system of claim 11, wherein the first wireless resource allocation comprises a first time slot allocation, and wherein the second wireless resource allocation comprises a second time slot allocation.

14. The system of claim 11, wherein the first wireless subscriber device is located in a sector coverage area associated with the second wireless base station device.

15. The system of claim 11, wherein the operations further comprise:
in response to determining that the first wireless base station device is out of service, transporting a subsequent data packet associated with the first wireless subscriber device between the first mesh base station device and the second wireless base station device.

16. The system of claim 11, wherein the operations further comprise:
   facilitating a third transfer of second data between the second wireless base station device and a fourth wireless subscriber device during the second period utilizing the second wireless resource allocation.

17. The system of claim 10, wherein the first wireless subscriber device is located in a sector coverage area associated with the first wireless base station device.

* * * * *